United States Patent
McDermott et al.

(10) Patent No.: US 7,519,008 B2
(45) Date of Patent: Apr. 14, 2009

(54) INELIGIBLE GROUP MEMBER STATUS

(75) Inventors: Michael James McDermott, Oronoco, MN (US); Robert Miller, Rochester, MN (US); Michael John Snyder, Lake City, MN (US); Kiswanto Thayib, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 937 days.

(21) Appl. No.: 10/454,855

(22) Filed: Jun. 5, 2003

(65) Prior Publication Data

US 2004/0246894 A1    Dec. 9, 2004

(51) Int. Cl.
*H04L 12/28* (2006.01)

(52) U.S. Cl. ............... 370/254; 709/201; 709/204; 709/205

(58) Field of Classification Search ........... 370/229
See application file for complete search history.

(56) References Cited

U.S. PATENT DOCUMENTS

| | | | | |
|---|---|---|---|---|
| 6,006,259 A | * | 12/1999 | Adelman et al. | ............ 709/223 |
| 6,973,023 B1 | * | 12/2005 | Saleh et al. | ............ 370/217 |
| 7,039,827 B2 | * | 5/2006 | Meyer et al. | ............ 714/4 |
| 2003/0041138 A1 | * | 2/2003 | Kampe et al. | ............ 709/223 |
| 2003/0140108 A1 | * | 7/2003 | Sampathkumar | ............ 709/208 |
| 2004/0010591 A1 | * | 1/2004 | Sinn et al. | ............ 709/225 |

* cited by examiner

*Primary Examiner*—Seema S. Rao
*Assistant Examiner*—Sai-Ming Chan
(74) *Attorney, Agent, or Firm*—Fleit Gibbons Gutman Bianco & Bongini PL

(57) ABSTRACT

A computing node that functions as a member within a computing system group, such as a cluster, that has a status allowing receipt of group messages even though the node is not an active member of the cluster. The node is able to function as a primary member or as a backup member that controls redundant resources to be utilized in case of a failure. The computing node is able to have one of two status values, an "Active" status and an "Ineligible" status. Members that are able to function as a primary member have an "Active" status assigned, and a member that is not configured or otherwise eligible to perform as a primary member is assigned an "Ineligible" status. Members with an Ineligible status receive all group messages and therefore are able to become configured and eligible to become a primary member.

4 Claims, 6 Drawing Sheets

STATUS

|   | GROUP | SITE |
|---|-------|------|
| A | ACTIVE | ACTIVE |
| B | ACTIVE | ACTIVE |
| C | INELIGIBLE | ACTIVE |
| D | INELIGIBLE | INELIGIBLE |

NODE 302  304  306  308  310  312

INELIGIBLE GROUP MEMBER STATUS

BACKGROUND OF THE INVENTION

1. Field of the Invention

This invention relates to operation of automated data processing equipment and more specifically to automated data processing equipment that utilizes multiple cooperating processors.

2. Description of Related Art

Automated data processing applications often execute on processing systems that have multiple processors. These multiple processors are frequently organized as groups and all of the members or nodes within the group operate in a cooperative manner. An example of a tightly integrated group of processors is a multiple processor computing cluster. One or more of these processors within a group can be referred to as a "node," where a node is defined as one or more processors that are executing a single operating system image. A node that is part of a group is referred to herein as a member of the group or a member node. The various members within a group are connected by a data communications system that supports data communications among all of the group members.

The members within a group are sometimes divided among different physical locations. A particular member that is part of a physically dispersed group generally has direct access to resources, such as data storage devices, printers, and other shared peripheral devices, that are co-located with that member. The resources that are used in current group operations are referred to as primary resources. The multiple members that are physically located at the same location are often able to all have access to and in some instances control peripheral devices located at the same location. These groups sometimes maintain redundant resources that contain duplicates of a primary resource and that can be quickly configured to become primary resources if required. Maintaining redundant resources in a group avoids single point failures for the group's operation.

A group that has a number of members typically defines one member to be a primary member for that group. The primary member is the primary point of access for the group and hosts the resources managed by the group. Other members within the group that are properly configured to be able to assume functions of the primary member, i.e., nodes that have their resources properly configured to assume the functions of the primary member, are referred to as backup members. In one example backup member may host redundant resources. In another example, a backup member may have access to primary resources that are normally hosted by the primary member. If a primary member fails, a backup member assumes the role of the primary member. When a backup member assumes the primary member functions, it either takes over the resources of the previous primary member or changes its redundant resources to be primary resources.

Communications among the members of a group is typically performed by a standard communications mechanism. Groups of members typically communicate via a group messaging mechanism that ensures that all members of the group receive all of the messages in the exact same order as all of the other members of the group. These group messaging techniques assume that all nodes require the same information as all other nodes and do not directly support asymmetries among group members. This is a particular impediment when trying to bring a new member into a group. Group communications mechanisms do not include a means to provide a new member with configuration data that would allow the new member to properly configure its resources so as to be able to become a backup member. This has resulted in the development of non-standard mechanisms for bringing new members into a group.

Therefore a need exists to overcome the problems with the prior art as discussed above, and particularly for a way to more efficiently allow members to enter a computing group.

SUMMARY OF THE INVENTION

Briefly, in accordance with the present invention, method for managing members of a computing system group consists of determining if a member of a computing system group is able to perform as a primary member. The method then assigns the member a first status if the member is able to perform as the primary member. The member otherwise assigns the member a second status if the member is not able to perform as the primary member. The member then processes all messages that are transmitted to all members of the group when the member is assigned one of the first status and the second status.

In another aspect of the present invention, a member of a computing system group has an eligibility monitor for determining if a member of a computing system group is able to perform as a primary member. The member also has a status monitor for assigning the member a first status if the member is able to perform as the primary member and for assigning the member a second status if the member is not able to perform as the primary member. The member further has a message processor for processing within the member all messages that are transmitted to all members of the group when the member is assigned one of the first status and the second status.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter which is regarded as the invention is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 3 is a node status table as is used by a group as illustrated in FIG. 1 in the exemplary embodiment of the present invention.

DESCRIPTION OF THE PREFERRED EMBODIMENTS

The present invention, according to a preferred embodiment, overcomes problems with the prior art by providing a system and method that assigns different status levels to members of computing system groups based upon their ability to become primary members of that group. These members are assigned a status of "Active" when the member is an active member of the group. These members are additionally assigned a status of "Ineligible" to indicate that the member is not eligible to become a primary member. Members with Ineligible status receive all group messages and are therefore able to configure themselves to become eligible as a primary member.

Computing System Group

Figure 1:
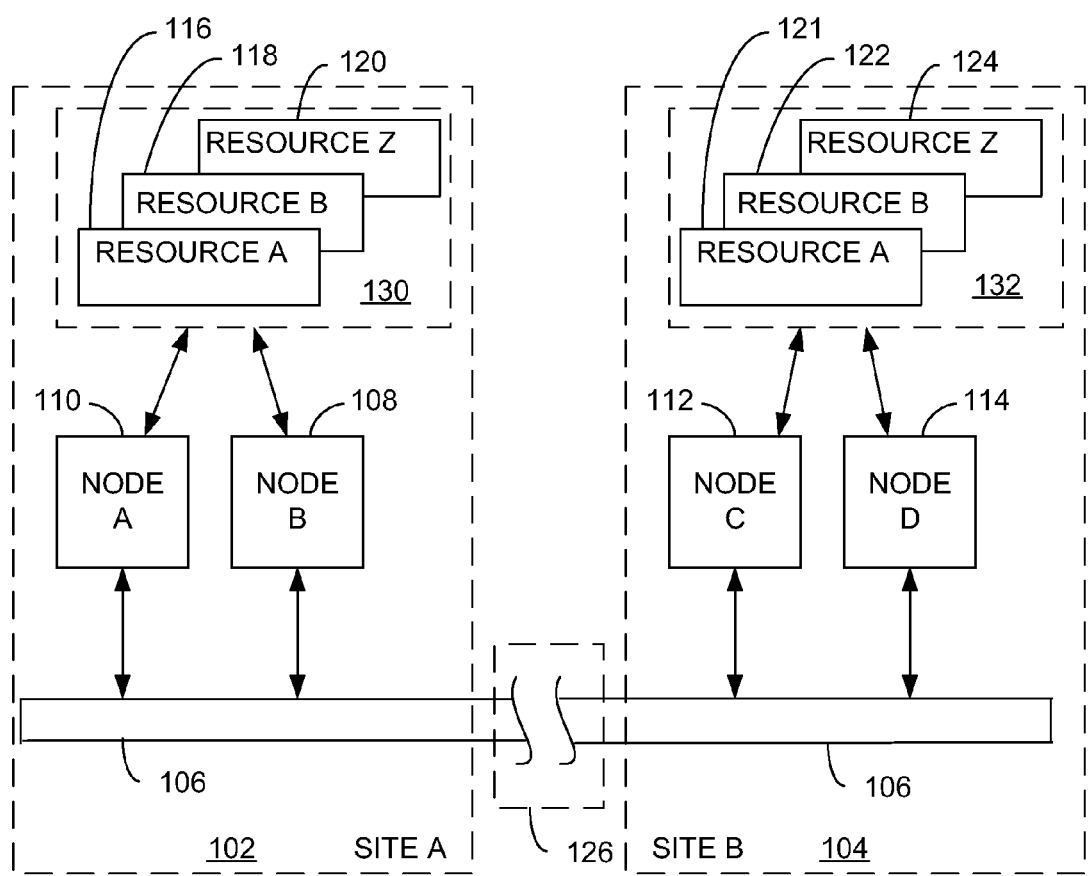
FIG. 1 is a computing system group illustrating the overall system architecture of an exemplary embodiment of the present invention.

Referring now in more detail to the drawings in which like numerals refer to like parts throughout several views, an exemplary computing system group 100 in which exemplary embodiments of the present invention operate is illustrated in FIG. 1. The exemplary computing system group 100 shows two sites, Site A 102 and Site B 104. Embodiments of the present invention operate with computing system groups that have any number of sites, from one to as many as are practical. The sites as used in this example are defined to be a group of computer nodes that have access to resources that are within one resource pool. For example, the nodes within Site A 102, i.e., Node A 110 and Node B 108, have access to the resources within Resource Pool A 130, i.e., Resource A 116, Resource B 118 and Resource Z 120. Similarly, the nodes within Site B 104, i.e., Node C 112 and Node D 114, have access to the resources in Resource Pool B 132, i.e., Resource A 121, Resource B 122 and Resource Z 124.

Each site in the exemplary embodiment has a number of nodes. Site A 102 is shown to have a Node A 110 and a Node B 108. These nodes are connected via a data communications network 106 that supports data communications between nodes that are part of the same site and that are part of different sites.

In this example, the sites are geographically removed from each other and are interconnected by an inter-site communications system 126. The inter-site communications system 126 connects the normally higher speed data communications network 106 that is contained within each site. The inter-site communications system 126 of the exemplary embodiment utilizes a high speed connection. Embodiments of the present invention utilize various inter-site communications systems 126 such as conventional WAN architectures, landline, terrestrial and satellite radio links and other communications techniques. Embodiments of the present invention also operate with any number of sites that have similar interconnections so as to form a continuous communications network between all nodes of the sites. Embodiments of the present invention also include "sites" that are physically close to each other, but that have computer nodes that do not have access to resources in the same resource pool. Physically close sites are able to share a single data communications network 106 and not include a separate inter-site communications system 126.

Resources contained within resource pools, such as Resource Pool A 130 and Resource Pool B 132, include data storage devices, printers, and other peripherals that are controlled by one node within the group. In the exemplary embodiments, a node is equivalent to a member of a computing system group. In the computing system group 100, one node or member is designated as the primary member for the group. The primary group member hosts primary resources for the computing group and acts as the point of access and hosts the resources managed by the group.

In addition to a primary group member, each site within the exemplary computing system group 100 has a primary site member. A primary site member performs similar processing as the primary group member but only for the nodes or members located at that site.

Computer Nodes and Group Members

Figure 2:
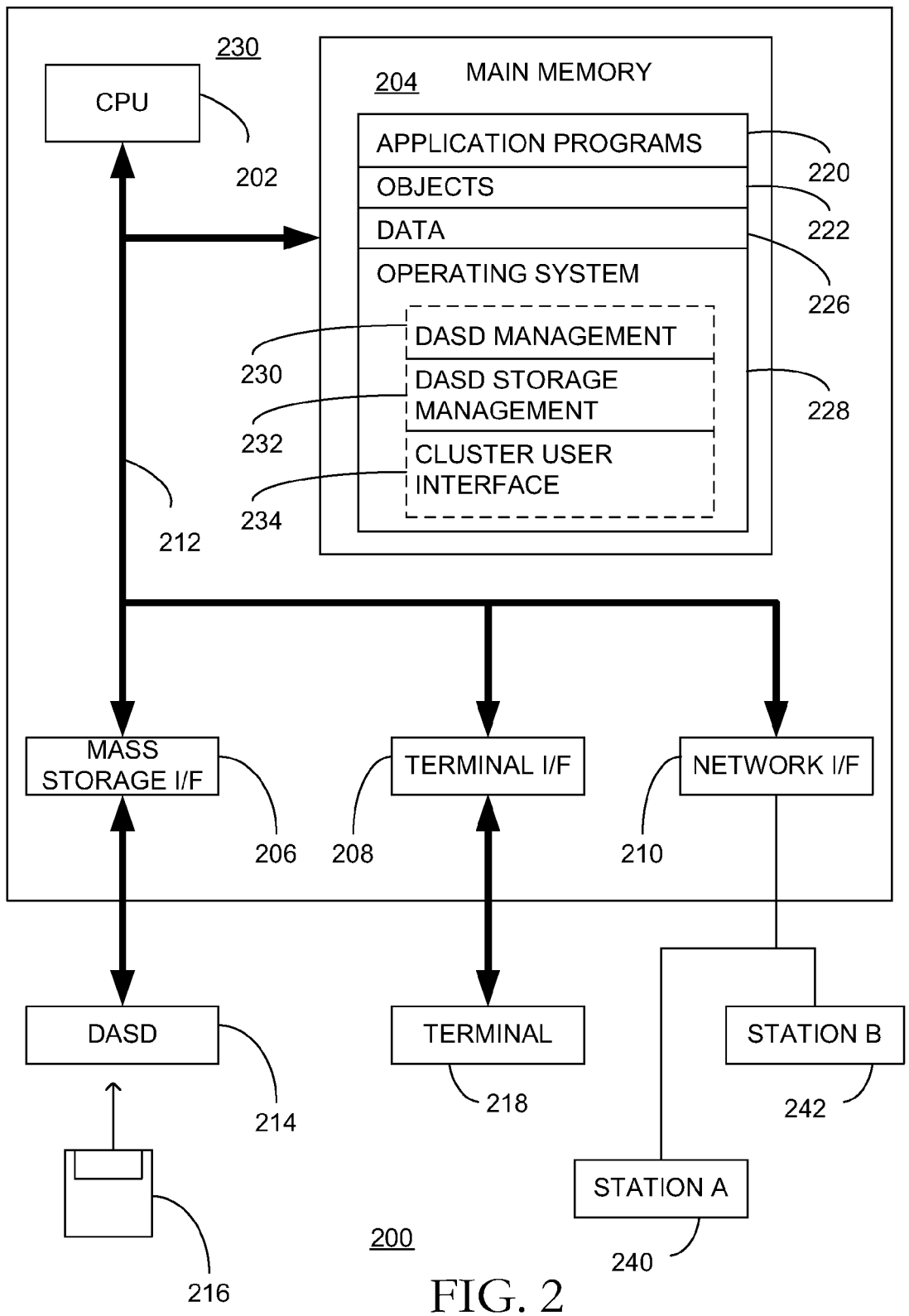
FIG. 2 is a block diagram depicting a group member of the group shown in FIG. 1, according to an exemplary embodiment of the present invention.

A block diagram depicting a group member 200, which is a computer system in the exemplary embodiment, of the group 100 according to an embodiment of the present invention is illustrated in FIG. 2. The group member 200 of the exemplary embodiment is an IBM eServer iSeries server system. Any suitably configured processing system is similarly able to be used by embodiments of the present invention. The computer system 200 has a processor 202 that is connected to a main memory 204, mass storage interface 206, terminal interface 208 and network interface 210. These system components are interconnected by a system bus 212. Mass storage interface 206 is used to connect mass storage devices, such as DASD device 214, to the computer system 200. One specific type of DASD device is a floppy disk drive, which may be used to store data to and read data from a floppy diskette 216.

Main Memory 204 contains application programs 220, objects 222, data 226 and an operating system image 228. Although illustrated as concurrently resident in main memory 204, it is clear that the applications programs 220, objects 222, data 226 and operating system 228 are not required to be completely resident in the main memory 204 at all times or even at the same time. Computer system 200 utilizes conventional virtual addressing mechanisms to allow programs to behave as if they have access to a large, single storage entity, referred to herein as a computer system memory, instead of access to multiple, smaller storage entities such as main memory 204 and DASD device 214. Note that the term "computer system memory" is used herein to generically refer to the entire virtual memory of computer system 200.

Operating system 228 is a suitable multitasking operating system such as the IBM OS/400 operating system. Embodiments of the present invention are able to use any other suitable operating system. Operating system 228 includes a DASD management user interface program 230, a DASD storage management program 232 and a group user interface program 234. Embodiments of the present invention utilize architectures, such as an object oriented framework mechanism, that allows instructions of the components of operating system 228 to be executed on any processor within computer 200.

Although only one CPU 202 is illustrated for computer 202, computer systems with multiple CPUs can be used equally effectively. Embodiments of the present invention incorporate interfaces that each include separate, fully programmed microprocessors that are used to off-load processing from the CPU 202. Terminal interface 208 is used to directly connect one or more terminals 218 to computer system 200. These terminals 218, which are able to be non-intelligent or fully programmable workstations, are used to allow system administrators and users to communicate with computer system 200.

Network interface 210 is used to connect other computer systems or group members, e.g., Station A 240 and Station B 242, to computer system 200. The present invention works with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. floppy disk 216, CD ROM, or other form of recordable media, or via any type of electronic transmission mechanism.

Embodiments of the present invention include an operating system 228 that includes a DASD management user interface program 230 that performs functions related to configuration, operation and other management functions, including functions for selecting one or more DASDs for an auxiliary storage pool (ASP). An ASP is defined as a set of disk units, and an independent auxiliary storage pool (IASP) is a set of disk units independent of a system. An IASP can be switched between systems, if its disk units are switchable and follow configuration and placement rules. The DASD management user interface program 230 is able to communicate with DASD storage management (DSM) program 232, which is a component of operating system 228 that provides internal support for managing disk units.

A computing system group, such as the cluster 100 of the exemplary embodiment, uses a group communications mechanism to communicate messages to all members of the group. Active group members receive all group messages, which are messages that are broadcast to all members of the group, and the group communications mechanism ensures these group messages are all received in the same order. An example of a group message is a command to add a user to an access control list. Computing groups conventionally assign a status of "Active" to all members that are participating in the group and are processing all group messages. A backup member with a status of "Active" is presumed to be able, i.e., has resources that are properly configured, to assume the role of a primary member.

When a member wishes to join a computing system group as a backup member, that member is required to properly configure its resources and to be otherwise configured so as to assume the functions of a primary member. This configuration includes communication group information to the new member so that redundant resources controlled by that member, such as redundant data storage units, are properly configured. Conventional computing system groups do not include a mechanism to perform this configuration and specialized processing must be developed by application developers to perform this configuration that must occur prior to joining a conventional computing system group.

In order to address this problem, embodiments of the present invention introduce a new status that is assigned to group members. In addition to the "Active" status that is assigned to members that are currently participating in group processing and communications, embodiments of the present invention assign a status of "Ineligible" to members that are not able to perform as a group member, e.g., as a backup member, within the group. A group member with an "Ineligible" status receives all messages communicated to group members and is thereby able to have its resources become properly configured so that it is eligible to assume the functions of a group primary. Messages in the exemplary embodiment are processed by a message processor that includes software executing on the processor of the member as well as communications circuits that are part of the member's hardware components.

In addition to a member's status relative to becoming a group primary member, a member also has a status relative to its ability to become a site primary member. An example node status table 300 as is used by a group 100 in the exemplary embodiment of the present invention is illustrated in FIG. 3. The example status table 300 shows two status values for each of four nodes, Node A 110, Node B 108, Node C 112 and Node D 114. The two status values for each node are contained in a column of the table. The status of each node relative to its ability to become a group primary is contained in group status column 302. The status of each node relative to its ability to become a site primary is contained in site status column 304. Each of the four nodes has a row in the table. The two status values for Node A are stored in row A 306, the two values for Node B are stored in row B 308, the two values for Node C are stored in row C 310, and the two values for Node D are stored in row D 312. The "Ineligible" nodes in this table are nodes that have resources that are not properly configured, such as due to recent start up or equipment failure at that node, so as to be able to assume the functions of a group primary or a site primary. As the resources at these nodes become properly configured to perform these primary duties, the node's status is changed to "Active," as is described below. Embodiments of the present invention do not include separate site primary members and the ability of a member to be a group primary is stored in the status table of those embodiments. Examples of embodiments with no site primary members are clusters with only one site or that do not define sites within their architectures.

As a result of the computing group structure of the exemplary embodiment, a member that has an "Ineligible" site member status also has an "Ineligible" group member status. It is possible, in this exemplary embodiment, that a member an "Active" site member status is able to have either an "Active" or "Inactive" group member status. It is therefore possible to have a dependency between the group member status and the site member status of a particular node.

Processing Flows

Figure 4:
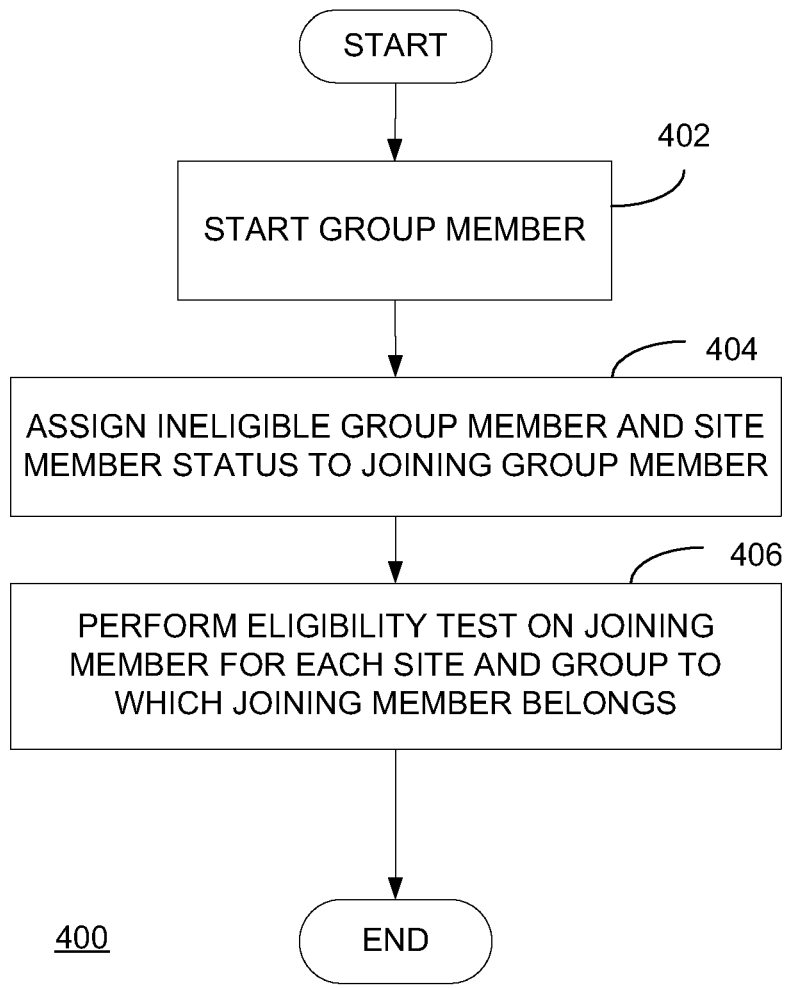
FIG. 4 is a member start up processing flow diagram according to an exemplary embodiment of the present invention.

A member start up processing flow diagram 400 according to an exemplary embodiment of the present invention is illustrated in FIG. 4. The member start up processing is performed when a group member, such as a Node A 110, is started or restarted and is to join a computing system group such as Computing System Group 100. The member start up processing flow begins, at step 402, by starting the group member. The start up processing includes conventional processing used to initially configure the node and its resources for operation as part of a group. Part of the start up processing in the exemplary embodiment includes registering for status messages that are produced by resources that are under the control of the member or that are produced by resources over which the member is able to assert control. After start up, the processing assigns, at step 404, a status of "Ineligible" to the group member. The exemplary embodiment utilizes programming of the processor of the member node as a status monitor to assign status values for the member. The processing continues by performing, at step 406, an eligibility test on the new member to determine if the member is able to become a primary member for each site and group to which the member belongs. The member start up processing for this embodiment is then complete. The eligibility test is described below and is performed by an eligibility monitor that is implemented in software executed by the member. The eligibility test determines eligibility of the member to become a group primary and a site primary in the exemplary embodiments.

Figure 5:
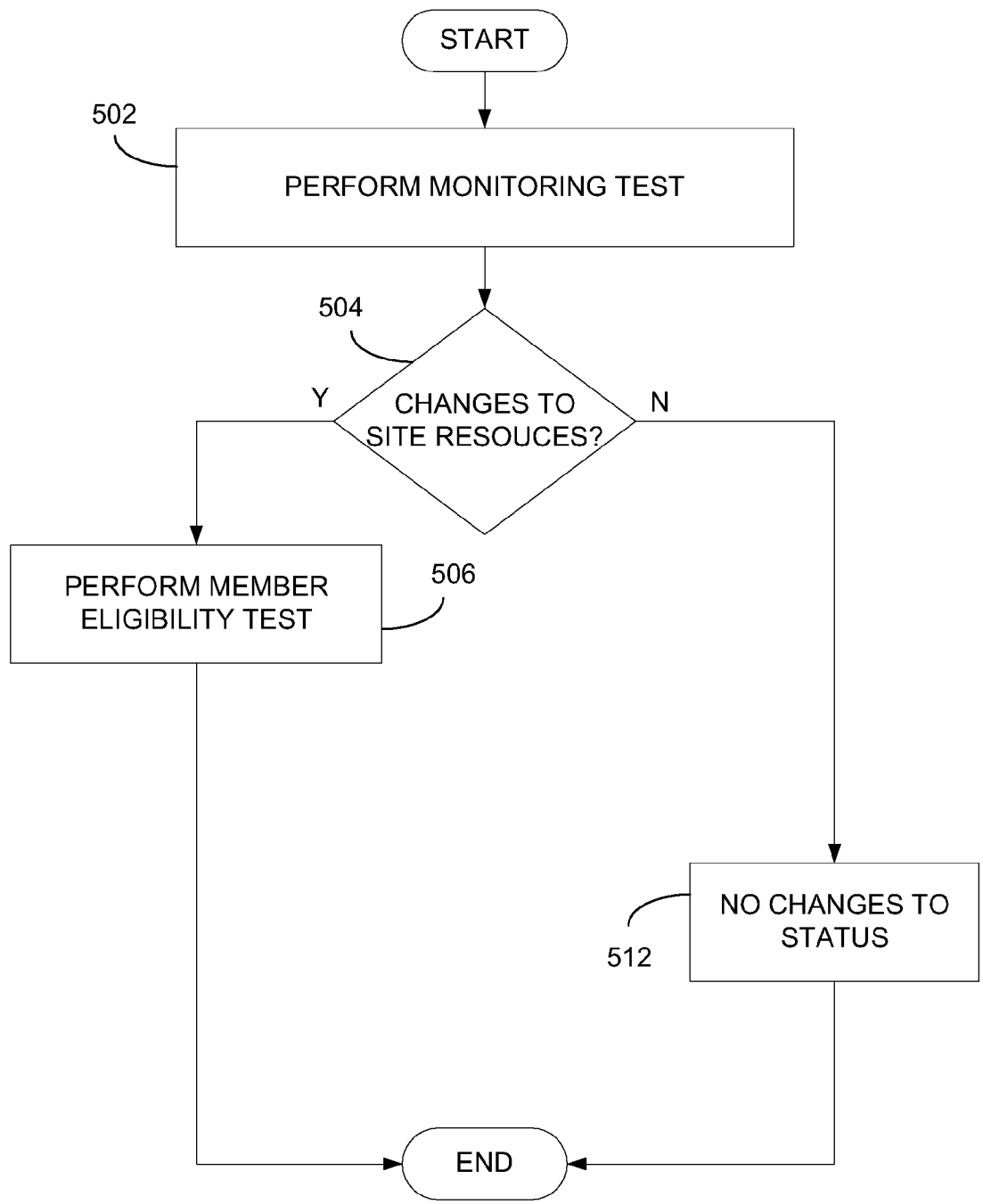
FIG. 5 is an exemplary status change processing flow according to an exemplary embodiment of the present invention.

After a member starts up and performs the member start up processing flow 400, the member executes a status change processing flow 500 in order to determine changes in the nodes status. A status change processing flow 500 according to an exemplary embodiment of the present invention is illustrated in FIG. 5. The status change processing flow 500 of the exemplary embodiment is performed, for example, in response to the receipt of a status message from a resource under the control of the member or a resource over which the member is able to assert control. The status change processing flow 500 is similarly performed whenever a change in resources is detected. Embodiments of the present invention perform the status change processing flow 500 periodically to implement what is in effect a polling of the status of the node. The exemplary status change processing flow 500 begins by performing, at step 502, a monitoring test. The monitoring test determines the status of the resources under the control of the member. The processing then determines, at step 504, if there has been a material change to the site resources. A material change in this example is a change that affects the ability of the member to assume the function of a primary for the site or group. If there is no material change in resource status, the processing continues by making, at step 512, no changes to the member's status and the processing then terminates until the next iteration of this processing flow, which is either performed in response to a relevant event or after a timed delay.

If there was determined to have been a material change in site resources, the processing continues by performing, at step 506, a member eligibility test. This member eligibility test is similar to the member eligibility test performed as part of the member start up processing flow 400 and is described below. The processing then terminates until the next iteration of this processing flow, which is either performed in response to a relevant event or after a timed delay.

Figure 6:
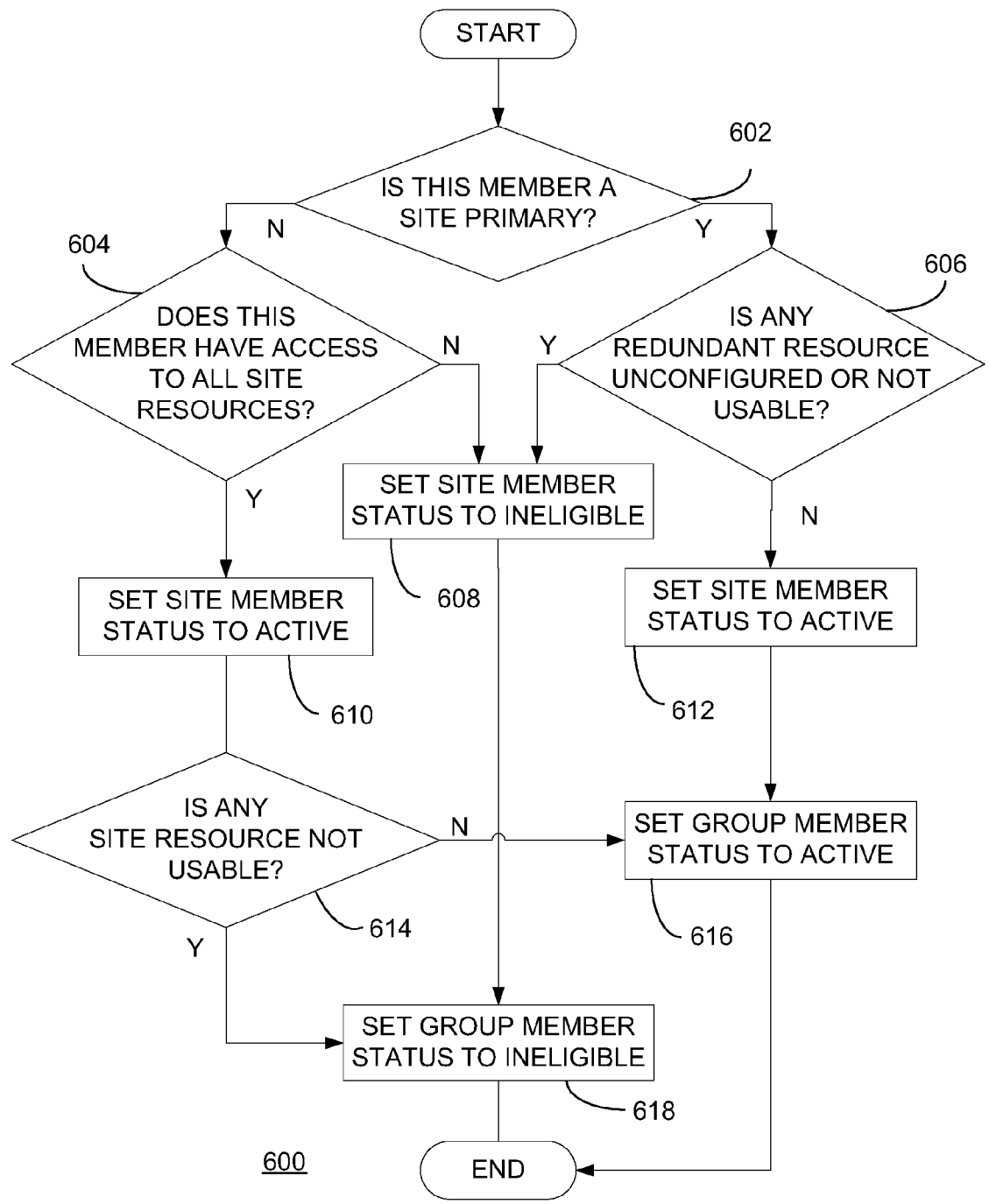
FIG. 6 is a member eligibility test processing flow according to an exemplary embodiment of the present invention.

A member eligibility test processing flow 600 according to an exemplary embodiment of the present invention is illustrated in FIG. 6. The member eligibility test is performed in the exemplary embodiment to test the member's ability to become both a group primary and to determine the member's ability to become a site primary. The member eligibility processing flow 600 beings by determining, at step 602, if this member is a primary member for the group or site according to the test being performed. If the member is a site primary, the processing continues by determining, at step 606, if any redundant resource is not configured or not usable. Redundant resources that are checked include data storage devices, such as IASPs, and any other resources related to this member's ability to retain its status as a primary. Testing in this step utilizes conventional testing techniques. The type and extent of resource checking performed in this step is dependent upon the ability of a member to be a group primary or a site primary according to the eligibility being determined. The exemplary embodiments use conventional testing to determine the status of these redundant resources. If there are no redundant resources that are not configured or not usable, the processing continues by setting, at step 612, the site member status to "Active" in order to indicate that this member is able to assume the functions of a site primary member. After setting the site member status to "Active," the processing continues by setting, at step 616, the group member status to "Active" in order to indicate that the member is also able to assume the functions of a group primary member.

If the member is not a primary member, the processing advances by determining, at step 604, whether the member has access to all site resources. In this example, that is a condition to its eligibility to assume the role of a primary member. If it is determined that the member has access to all site resources, the processing continues by setting, at step 610, the site member status to "Active" to indicate that this member is able to assume the functions of a site primary member. After setting the site member status to an "Active" status, the processing continues by determining, at step 614, if any site resource accessible by this node is not usable. If any site resource is determined to not be usable, the processing advances to setting, at step 618, the group member status of this member to "Ineligible" and the processing stops. If none of the site resources are determined to be not usable, the processing continues by setting, at step 616, the group member status for this member to "Active," and the processing terminates.

If the processing determined, at step 604, that the member did not have access to all site resources, or the processing determined, at step 606, that any redundant resource is unconfigured or not usable, the processing of the exemplary embodiment continues by setting, at step 608, the site member status of the member to "Ineligible." The processing then sets, at step 618, the group member status to "Ineligible" and the processing then stops.

Non-Limiting Software and Hardware Examples

Embodiments of the invention can be implemented as a program product for use with a computer system such as, for example, the cluster computing environment shown in FIG. 1 and described herein. The program(s) of the program product defines functions of the embodiments (including the methods described herein) and can be contained on a variety of signal-bearing medium. Illustrative signal-bearing medium include, but are not limited to: (i) information permanently stored on non-writable storage medium (e.g., read-only memory devices within a computer such as CROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Each computer system may include, inter alia, one or more computers and at least a signal bearing medium allowing a computer to read data, instructions, messages or message packets, and other signal bearing information from the signal bearing medium. The signal bearing medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the signal bearing medium may comprise signal bearing information in a transitory state medium such as a network link and/or a network interface, including a wired network or a wireless network, that allow a computer to read such signal bearing information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for managing nodes which are members of a computing system group, the method on a member comprising:

determining that a configuration of a member of a computing system group is able to assume a role of a primary member of the computing system group, wherein all members of the computing system group receive, in order, all messages directed to group members and wherein at least one subset of members within the computing system group are associated with a site, wherein members at the site have access to resources that are within one resource pool associated with the site, and wherein the determining comprises determining that the member is able to assume a role as a primary site member, wherein the primary site member has access to all resources associated with the site;

assigning, in response to determining that the configuration of the member of the computing system group is able to support performance as a primary member, the member a first status;

assigning, in response to determining that the configuration of the member of the computing system group is not able to support performance as a primary member, the member a second status;

processing within the member all messages that are transmitted to all members of the group when the member is assigned the first status and when the member is assigned the second status, wherein the configuration of the member, while assigned either the first status or the second status, is adjusted based upon contents of the messages;

determining that the member is able to assume a role as a primary group member of the computing system group, wherein the assigning the member the first group status is further in response to determining that the member is able to assume the role as the primary group member, and wherein the assigning the member the second group status is further in response to determining that the member is not able to assume the role as the primary group member.

2. The method according to claim 1, wherein the first status is assigned in response to determining that the member has access to all resources at its site, and the second status is assigned in response to determining that the member does not have access to all resources at its site.

3. The method according to claim 1, wherein the first status is assigned when the member is connected to at least one redundant resource and all resources within the at least one redundant resource are configured and usable, and the second status is assigned when the member is connected to at least one redundant resource that is at least one of not configured and not usable.

4. The method according to claim 1, wherein the first status indicates that the member is configured to be able to support performance as a primary member and wherein the second status indicates that the member is not configured to be able to support performance as a primary member.

* * * * *